(12) United States Patent
Fu et al.

(10) Patent No.: US 10,852,267 B2
(45) Date of Patent: Dec. 1, 2020

(54) BIOSENSOR ELECTRODE AND BIOSENSOR USING THE SAME

(71) Applicants: Tsinghua University, Beijing (CN); HON HAI PRECISION INDUSTRY CO., LTD., New Taipei (TW)

(72) Inventors: Hong-Ying Fu, Beijing (CN); Wen-Zhen Li, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 257 days.

(21) Appl. No.: 15/792,795

(22) Filed: Oct. 25, 2017

(65) Prior Publication Data
US 2018/0321177 A1 Nov. 8, 2018

(30) Foreign Application Priority Data
May 8, 2017 (CN) .......................... 2017 1 0318859

(51) Int. Cl.
| | | |
|---|---|---|
| *G01N 27/327* | (2006.01) | |
| *B82B 3/00* | (2006.01) | |
| *C01B 32/168* | (2017.01) | |
| *G01N 27/30* | (2006.01) | |

(52) U.S. Cl.
CPC ......... *G01N 27/327* (2013.01); *B82B 3/0047* (2013.01); *C01B 32/168* (2017.08); *G01N 27/308* (2013.01)

(58) Field of Classification Search
CPC ...... G01N 27/48; G01N 27/26; G01N 27/327; G01N 27/10; G01N 27/06; G01N 27/3272; G01N 27/40; C12Q 1/00; C12Q 1/02; C12Q 1/006; C12Q 1/34; C12Q 1/54; A61B 5/14532; A61B 5/05; Y10S 977/773; Y10S 977/81; Y10S 977/92; Y10S 977/898
See application file for complete search history.

(56) References Cited

U.S. PATENT DOCUMENTS

2006/0073089 A1 4/2006 Ajayan et al.
2006/0273005 A1 12/2006 Love et al.
(Continued)

FOREIGN PATENT DOCUMENTS

| CN | 101465434 | 6/2009 |
|---|---|---|
| CN | 101465434 A | 6/2009 |

(Continued)

OTHER PUBLICATIONS

Ding, et al., Assembly of carbon nanotubes on a nanoporous gold electrode for acetylcholinesterase biosensor design, Sensors and Actuators B:Chemical, Sensors and Actuators B 199(2014) 284-290; Apr. 18, 2014.
(Continued)

*Primary Examiner* — Gupreet Kaur
(74) *Attorney, Agent, or Firm* — ScienBiziP, P.C.

(57) ABSTRACT

A biosensor electrode comprises comprising a porous structure comprising a plurality of metal ligaments and a plurality of pores; and at least one carbon nanotube structure embedded in the porous structure and comprising a plurality of carbon nanotubes joined end to end by van der Waals attractive force, wherein the plurality of carbon nanotubes are arranged along a same direction.

18 Claims, 8 Drawing Sheets

(56) References Cited

U.S. PATENT DOCUMENTS

| | | | | |
|---|---|---|---|---|
| 2009/0008248 | A1* | 1/2009 | Shimomura | B82Y 5/00 |
| | | | | 204/403.14 |
| 2009/0229989 | A1* | 9/2009 | Urgen | C23F 1/36 |
| | | | | 205/150 |
| 2011/0024719 | A1* | 2/2011 | Sridhar | B81C 1/00031 |
| | | | | 257/9 |
| 2011/0051322 | A1* | 3/2011 | Pushparaj | C23C 16/24 |
| | | | | 361/525 |
| 2011/0171559 | A1 | 7/2011 | Zhang et al. | |
| 2012/0032366 | A1* | 2/2012 | Ivniski | C22C 1/08 |
| | | | | 264/51 |
| 2012/0118501 | A1 | 5/2012 | Feng et al. | |
| 2012/0325669 | A1* | 12/2012 | Kim | C25D 5/022 |
| | | | | 205/109 |
| 2014/0186256 | A1* | 7/2014 | Wu | C23C 14/0605 |
| | | | | 423/447.3 |
| 2014/0322608 | A1* | 10/2014 | Claussen | H01G 11/36 |
| | | | | 429/224 |
| 2014/0329018 | A1 | 11/2014 | Berrang | |
| 2015/0099062 | A1 | 4/2015 | Tseng et al. | |
| 2015/0253277 | A1 | 9/2015 | Wada et al. | |
| 2017/0145562 | A1 | 5/2017 | Farquhar et al. | |
| 2018/0183041 | A1* | 6/2018 | Tour | H01M 4/133 |
| 2019/0113326 | A1 | 4/2019 | Pegan et al. | |

FOREIGN PATENT DOCUMENTS

| | | |
|---|---|---|
| CN | 102464311 A | 5/2012 |
| CN | 102690968 | 9/2012 |
| CN | 102690968 A | 9/2012 |
| CN | 102709569 | 10/2012 |
| CN | 102709569 A | 10/2012 |
| CN | 105664937 A | 6/2016 |
| CN | 105779804 | 7/2016 |
| CN | 106611627 A | 5/2017 |
| CN | 106784852 A | 5/2017 |
| JP | 2002-523617 | 7/2002 |
| JP | 2009-138252 | 6/2009 |
| JP | 2014-198326 | 10/2014 |
| TW | 201405926 A | 2/2014 |
| TW | 201515311 A | 4/2015 |
| TW | 201704148 A | 2/2017 |
| WO | 2013010245 | 1/2013 |
| WO | 2015179320 | 11/2015 |
| WO | 2015179320 A1 | 11/2015 |
| WO | 2016/152645 | 9/2016 |
| WO | 2017/087240 | 5/2017 |

OTHER PUBLICATIONS

Jiawang Ding et al., Assembly of carbon nanotubes on a nanoporous gold eletrode for acetylcholinesterase biosensor design, Sensors and Actuators B, Apr. 18, 2014, vol. 199, 284-290.

Elsebeth Schroder et al., Van der Waals interactions of parallel and concentric nanotubes, Material science and engineering c, Dec. 31, 2003, vol. 23, 721-725.

\* cited by examiner

(12) United States Patent
US 10,852,267 B2

BIOSENSOR ELECTRODE AND BIOSENSOR USING THE SAME

CROSS-REFERENCE TO RELATED APPLICATIONS

This application claims all benefits accruing under 35 U.S.C. § 119 from China Patent Application No. 201710318859.0, filed to May 8, 2017 in the China Intellectual Property Office, the disclosure of which is incorporated herein by reference. The application is also related to copending applications entitled, "THREE-DIMENSIONAL POROUS COMPOSITE STRUCTURE", filed Oct. 25, 2017 (Ser. No. 15/792,790); "METHOD FOR MAKING THREE-DIMENSIONAL POROUS COMPOSITE STRUCTURE", filed Oct. 25, 2017 (Ser. No. 15/792,791); "ANODE OF LITHIUM BATTERY AND LITHIUM BATTERY USING THE SAME", field Oct. 25, 2017 (Ser. No. 15/792,792); and "FUEL CELL ELECTRODE AND FUEL CELL USING THE SAME", field Oct. 25, 2017 (Ser. No. 15/792,793).

FIELD

The subject matter herein generally relates to a biosensor electrode and a biosensor using the same.

BACKGROUND

Biosensors have high sensitivity, good reliability, rapid response, good selectivity and low cost, therefore the biosensors are used to detect the weight concentration of biomolecules. The biosensor includes a molecular recognition element and a signal conversion element. The molecular recognition element is configured to identify a biochemical reaction signal and the signal conversion element is configured to convert the biochemical reaction signal into an electrical signal.

The molecular recognition element in the biosensor is composed of an electrode and a material having electrocatalytic properties. The material having electrocatalytic properties are generally combined with the electrode by bonding or physical contact. The electrode is used to collect the current generated by the biochemical reaction. The material having an electrocatalytic activity is reacted with a biomolecule to be measured for catalytic use.

In general, because the nanoporous metal structure has a large specific surface area, which can achieve higher sensitivity and lower detection limits, so the nanoporous metal structure is used for the electrode. However, the nanoporous metal structure is very fragile. A conductivity of the nanoporous metal structure is low, and strength of the nanoporous metal structure is poor, which effect working life of the biosensor electrode and the biosensor using the same.

What is needed, therefore, is to provide a biosensor electrode and a biosensor using the same which can overcome the shortcomings as described above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

FIG. 4b is a Scanning Electron Microscope (SEM) image of cross-section of the three-dimensional porous composite structure in FIG. 4a.

DETAILED DESCRIPTION

Figure 1:
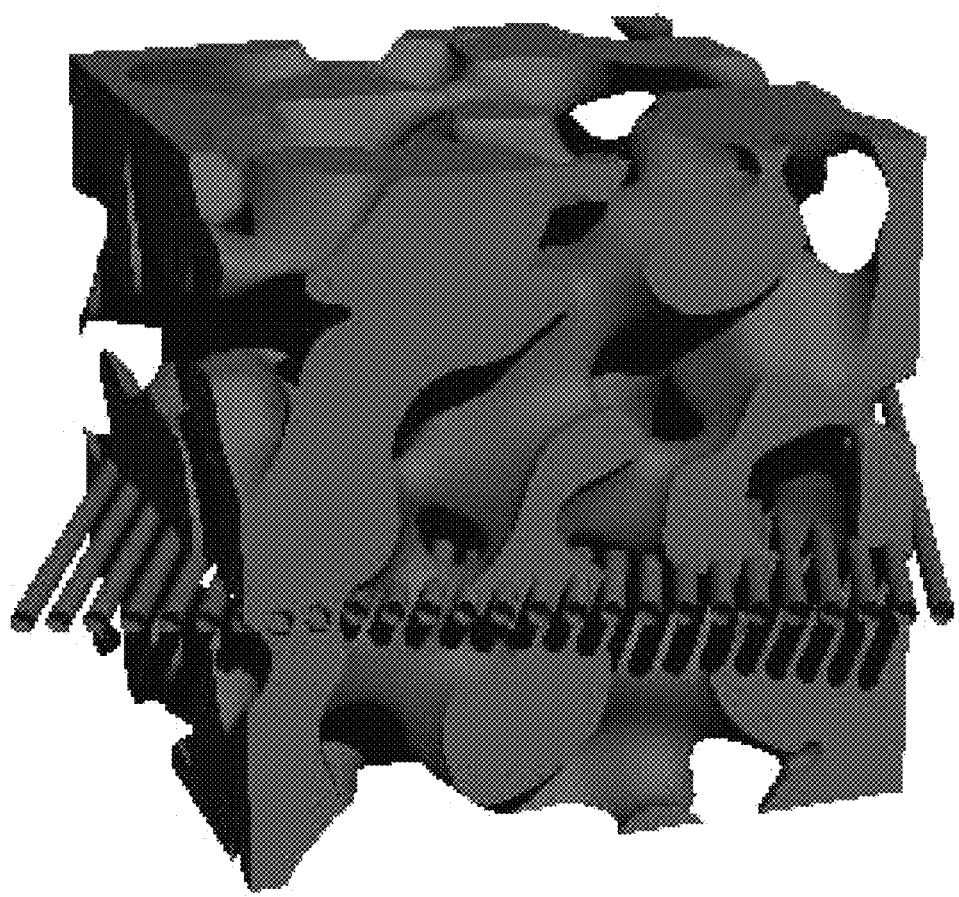
FIG. 1 is a schematic view according to one embodiment of the three-dimensional porous composite structure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The connection can be such that the objects are permanently connected or releasably connected. The term "substantially" is defined to be essentially conforming to the particular dimension, shape or other word that substantially modifies, such that the component need not be exact. The term "comprising" means "including, but not necessarily limited to"; it specifically indicates open-ended inclusion or membership in a so-described combination, group, series and the like. It should be noted that references to "an" or "one" embodiment in this disclosure are not necessarily to the same embodiment, and such references mean at least one.

The present disclosure relates to a biosensor electrode described in detail as below.

A biosensor electrode according to one embodiment is provided. The biosensor electrode includes a three-dimensional porous composite structure. The biosensor electrode can further include a material with catalytic property. The material with catalytic property can be located in a surface of the three-dimensional porous composite structure. The material with catalytic property can be nano-oxides or metal particles, which can further improve catalytic property of the biosensor electrode. The nano-oxides can be a compound, such as $Co_3O_4$, and $MnO_2$. The nano-oxides are grown on the three-dimensional porous composite structure by chemical method or electrochemical method. In one embodiment, the material with catalytic property is nanometer Pt particle.

Figure 2:
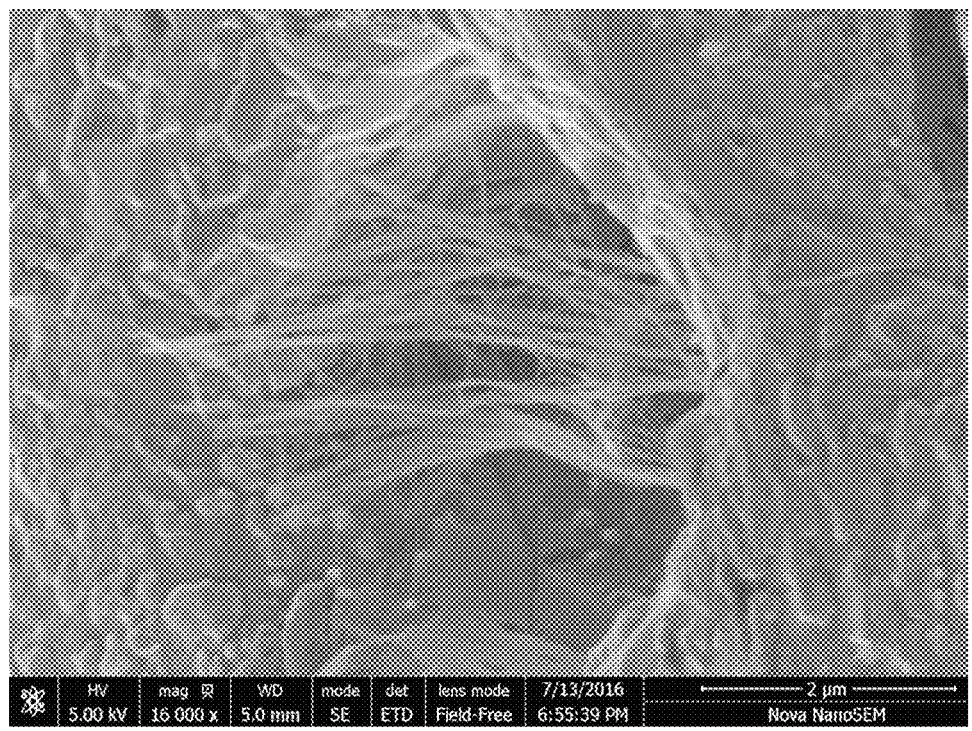
FIG. 2 is a Scanning Electron Microscope (SEM) image of a plurality of carbon nanotubes locating in a pore in the three-dimensional porous composite structure.

Referring to FIG. 1 and FIG. 2, a three-dimensional porous composite structure according to one embodiment is provided. The three-dimensional porous composite structure is a three-dimensional network structure. The three-dimensional porous composite structure includes a porous structure and at least one carbon nanotube structure. The at least one carbon nanotube structure is embedded in the porous structure.

The porous structure includes a plurality of metal ligaments. The plurality of metal ligaments define a plurality of pores. Each of the plurality of pores is formed by adjacent metal ligaments. The plurality of pores can be regularly distributed or irregularly distributed. Size of the plurality of pores are less than or equal to 100 micrometers. The metal ligaments can be made of inert metal materials. Examples of the inert metal materials comprise copper (Cu), mercury (Hg), silver (Ag), platinum (Pt) and aurum (Au).

The carbon nanotube structure includes a plurality of carbon nanotubes combined by van der Waals force therebetween. The carbon nanotube structure has good mechanical strength, toughness and conductivity. The carbon nanotube structure further includes a plurality of micropores. The plurality of micropores can be defined by adjacent carbon nanotubes in the carbon nanotube structure.

When the three-dimensional porous composite structure includes a plurality of carbon nanotube structures, the plurality of carbon nanotube structures can be spaced from each other. An angle θ between carbon nanotubes in adjacent spaced carbon nanotube structures can be ranged from 0° to 90°.

The carbon nanotube structure can be an ordered carbon nanotube structure. The term 'ordered carbon nanotube structure' refers to a structure where the carbon nanotubes are arranged in a consistently systematic manner, e.g., the carbon nanotubes are arranged approximately along a same direction. The carbon nanotube structure includes at least one carbon nanotube film. The carbon nanotube film can be a drawn carbon nanotube film.

The drawn carbon nanotube film includes a plurality of successive and oriented carbon nanotube segments joined end-to-end by van der Waals force therebetween. The drawn carbon nanotube film is a free-standing film. The drawn carbon nanotube film can be obtained by drawing from a carbon nanotube array substantially along a same direction. The carbon nanotube film has good mechanical strength, toughness and conductivity.

If the carbon nanotube structure includes a plurality of carbon nanotube films, the plurality of carbon nanotube films can be coplanar or stacked. An angle α between carbon nanotubes in adjacent stacked carbon nanotube films can be ranged from 0° to 90°.

The at least one carbon nanotube film are embedded in the porous structure. One part of the carbon nanotubes in the carbon nanotube film are embedded in the metal ligament, and another part of the carbon nanotubes in the carbon nanotube film are located in the plurality of pores, and/or the others part of the carbon nanotubes in the carbon nanotube film are exposed from surface of the porous structure.

The three-dimensional porous composite structure has the following advantages: the carbon nanotube structure is embedded in the porous structure, the three-dimensional porous composite structure has good electrical conductivity, toughness and stability; and has a large specific surface area; the carbon nanotubes as a strengthen structure are embedded in the metal ligament to make the porous structure strong.

Figure 3:
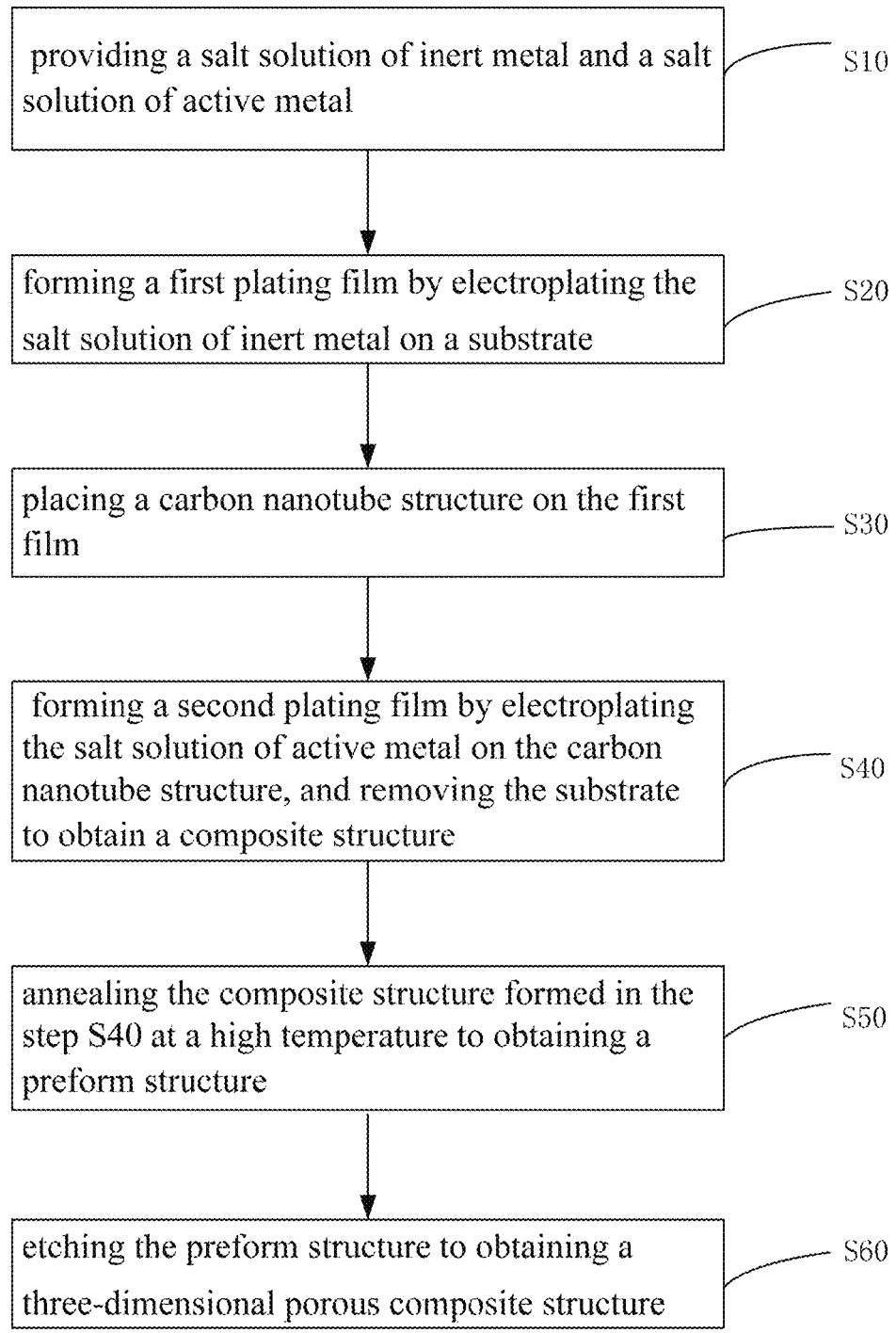
FIG. 3 is a flow chart of a method for making the three-dimensional porous composite structure.

Referring to FIG. 3, one embodiment of a method for making the three-dimensional porous composite structure comprising the following steps:

S10, providing a salt solution of inert metal and a salt solution of active metal;

S20, forming a first plating film by electroplating the salt solution of inert metal on a substrate;

S30, placing a carbon nanotube structure on the first plating film;

S40, forming a second plating film by electroplating the salt solution of active metal on the carbon nanotube structure; and removing the substrate to obtain a composite structure;

S50, annealing the composite structure formed in the step S40 at a high temperature to obtain a preform structure;

S60, etching the preform structure to obtain a three-dimensional porous composite structure.

In step S10, the inert metal material can be selected from a group comprising copper (Cu), mercury (Hg), silver (Ag), platinum (Pt) and aurum (Au). The active metal material can be selected from potassium (K), calcium (Ca), sodium (Na), magnesium (Mg), aluminum (Al), zinc (Zn), iron (Fe), tin (Sn) and nickel (Ni). Compared with the inert metal, the active metal is very easy to react with acid and alkali solution. Further, the salt solution of inert metal is sufficiently mixed with glucose, which can refine the following the first plating film. In one embodiment, the salt solution of inert metal is $ZnSO_4$, the salt solution of active metal is $CuSO_4$.

In step S20, the substrate can be made of pure metal material or metal alloy. The metal material or the metal alloy is not limited. Examples of the metal material can be titanium (Ti), silver (Ag), platinum (Pt) and aurum (Au). A method for forming the first plating film includes the following sub-steps:

S21, providing an inert metal plate used as a counter electrode, and using the substrate as a working electrode;

S22, providing a certain voltage between the substrate and the inert metal plate to form the first plating film.

In step (S21), the inert metal plate can be made of inert metal materials.

In step (S22), inert metal ions in the salt solution of inert metal get electrons to form metal atoms, and the metal atoms are deposited on surface of the substrate to form the first plating film. The first plating film is located on surface of the substrate.

In step S30, the carbon nanotube structure includes at least one carbon nanotube film. The at least one carbon nanotube film is sequentially laid on the first plating film. The carbon nanotube film includes a plurality of successive and oriented carbon nanotubes joined end-to-end by van der Waals force therebetween. When the carbon nanotube structure includes a plurality of carbon nanotube films, the plurality of carbon nanotube films can be coplanar or stacked. Adjacent carbon nanotube films are set at a certain angle.

A method for obtaining the carbon nanotube film is not limited. In one embodiment, a method of making the carbon nanotube film includes the steps of:

S31: providing an array of carbon nanotubes; and

S32: pulling out at least one carbon nanotube film from the carbon nanotube array.

In step S31, the carbon nanotube array is grown on a growing substrate by chemical vapor deposition. The carbon nanotube array includes a plurality of carbon nanotubes. The carbon nanotubes in the carbon nanotube array are substantially parallel with each other and perpendicular to the growing substrate.

In step S32, the carbon nanotube film can be drawn by the steps of:

S32a: selecting one or more carbon nanotubes having a predetermined width from the array of carbon nanotubes; and S32b: pulling the carbon nanotubes to obtain carbon nanotube segments at an even/uniform speed to achieve a uniform carbon nanotube film.

In step S32b, the carbon nanotube segment includes a number of substantially parallel carbon nanotubes. The carbon nanotube segments can be selected by using an adhesive tape as the tool to contact the super-aligned array of carbon nanotubes. The pulling direction can be substantially perpendicular to the growing direction of the super-aligned array of carbon nanotubes. More specifically, during the pulling process, as the initial carbon nanotube segments are drawn out, other carbon nanotube segments are also drawn out end to end due to van der Waals force between ends of adjacent segments. This process of pulling produces a substantially continuous and uniform carbon nanotube film having a predetermined width can be obtained.

In step S40, A method for forming the second plating film includes the following sub-steps:

S41, providing an active metal plate used as a counter electrode, and using the structure formed in step S30 as a working electrode;

S42, providing a certain voltage between the structure formed in step S30 and the active metal plate to form the second plating film.

During the electroplating process, active metal ions in the salt solution of active metal get electrons to form active metal atoms. A large number of active metal atoms are deposited on the surface of the carbon nanotube structure, and a small number of active metal atoms can be deposited into the micropores between adjacent carbon nanotubes in the carbon nanotube structure.

The composite structure includes the first plating film, the carbon nanotube structure and the second plating film, which are stacked with each other. Further, a plurality of composite structures can be formed by repeating step S10 to S40. The plurality of composite structures are stacked. The first plating film is formed on the second plating film, and the carbon nanotube structure is located on the first plating film, and the second plating film is formed on the carbon nanotube structure. An arrange direction of the carbon nanotubes in the carbon nanotube structure can be selected according to practical needs.

In step S50, the process of annealing the composite structure at high temperature comprises: heating the composite structure at a high temperature to melt the first plating film and the second plating film, which the inert metal atoms in the first plating film are mixed with the active metal atoms in the second plating film to form a middle structure; then annealing and cooling the middle structure to form an alloy of the active metal and the inert metal. The preform structure includes an alloy of the active metal and the inert metal and the carbon nanotube structure. The alloy of the active metal and the inert metal is located on the surface of the carbon nanotubes and the micropores of adjacent carbon nanotubes in the carbon nanotube structure. Further, the alloy of the active metal and the inert metal is located in the nodes of the carbon nanotubes joined end to end therebetween.

Different metal materials have different annealing temperature. The annealing temperature can be controlled according to the type of the metal materials. By controlling the annealing temperature different metal atoms can be fully diffused. During the process of high temperature annealing, both the inert metal and active metal grow directly on the carbon nanotubes to reduce the contact resistance between the carbon nanotube structure and the alloy of the inert metal and active metal. An interface between the carbon nanotubes and the alloy is a coherent interface. The annealing temperature is equal to or greater than 300° C. In one embodiment, the annealing temperature is about 450° C.

Figure 4A:
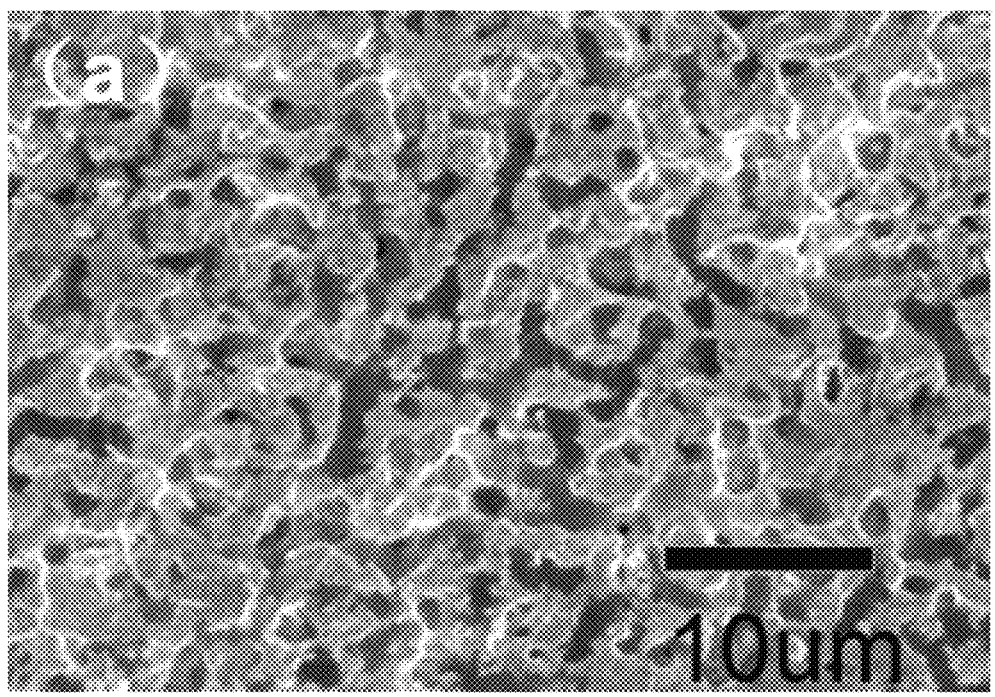
FIG. 4a is a Scanning Electron Microscope (SEM) image of three-dimensional porous composite structure obtained by chemical corrosion of 0.05 g/L dilute hydrochloric acid.
Figure 4B:
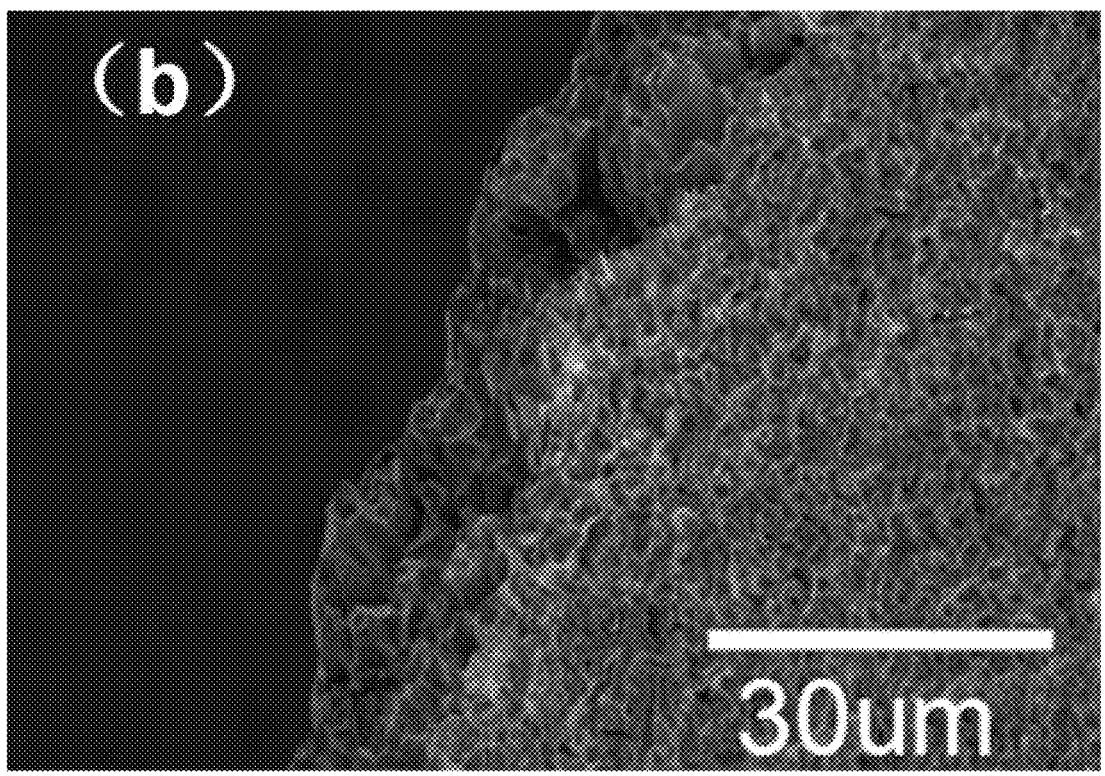
Figure 5:
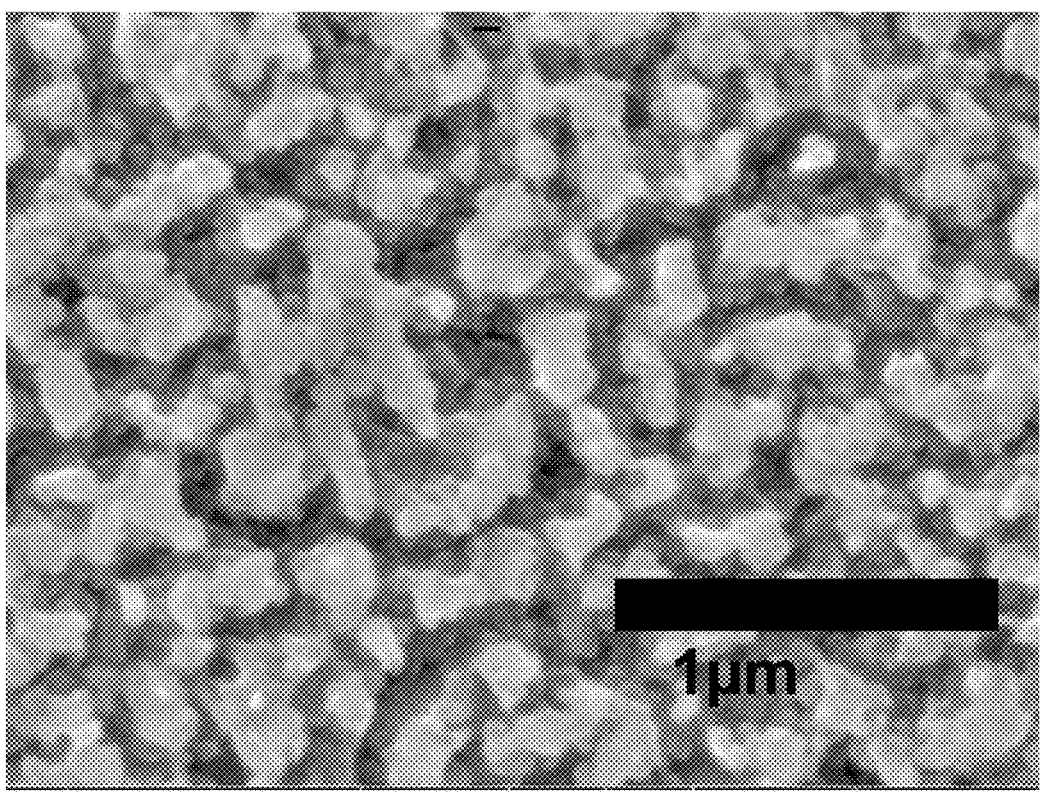
FIG. 5 is a Scanning Electron Microscope (SEM) image of the three-dimensional porous composite structure obtained by electrochemical corrosion of 0.05 g/L dilute hydrochloric acid.

In step S60, referring to FIG. 4a, FIG. 4b and FIG. 5, the method for etching the preform structure can be electrochemical corrosion or chemical corrosion. The preform structure is immersed in a dilute acid solution or dilute alkali solution. A plurality of pores are formed in the preform structure, due to the active metal in the preform structure occur chemical reaction with the dilute acid solution or dilute alkali solution.

In one embodiment, an electrochemical corrosion method is used to etch the preform structure, in which the size of pores can be easily controlled. The size and distribution rate of the pores are determined by a ratio of active metal to inert metal, dilute acid concentration, dilute alkali concentration and length of etching time. The longer the etching time, the larger the size of pores. In another embodiment, the dilute acid solution is dilute hydrochloric acid, and the weight concentration of the dilute hydrochloric acid is 0.05 mol/L. The size of pores is about 1 μm.

Figure 6:
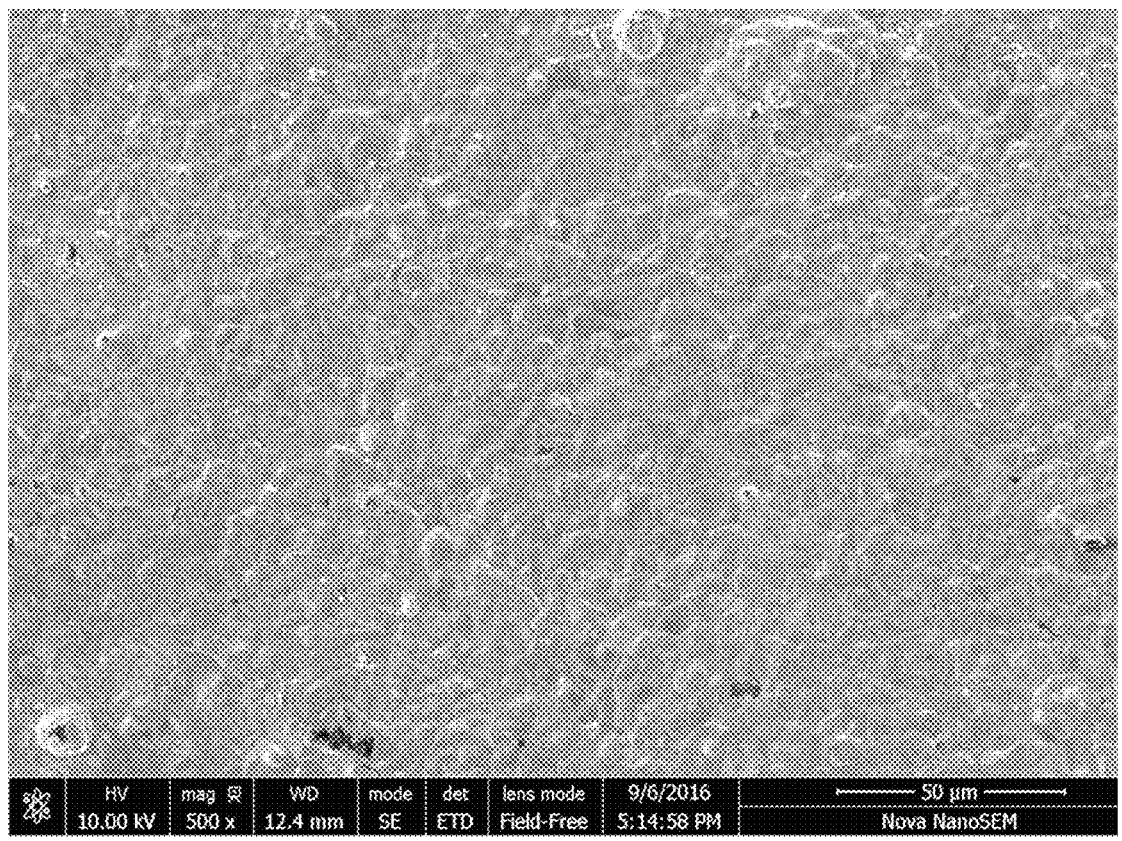
FIG. 6 is a Scanning Electron Microscope (SEM) image of the three-dimensional porous composite structure at a low magnification.
Figure 7:
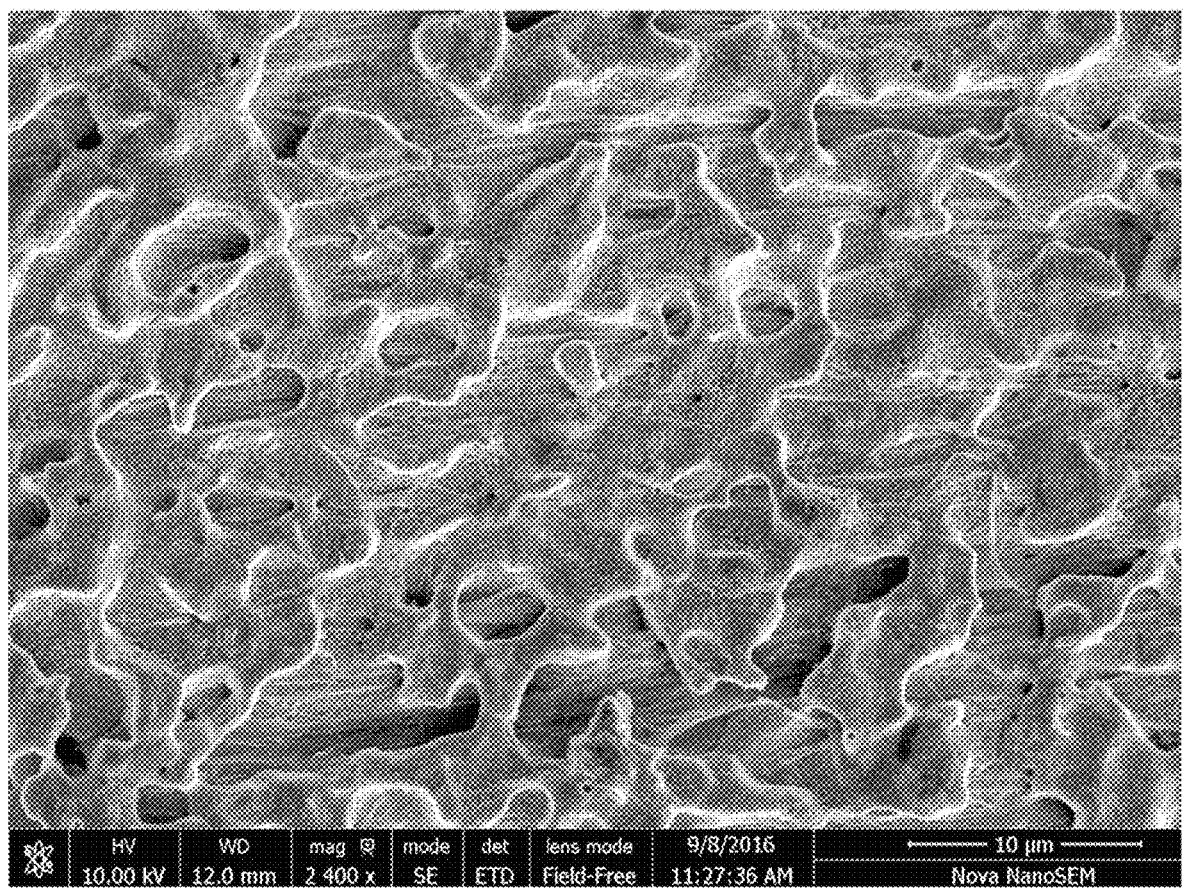
FIG. 7 is a Scanning Electron Microscope (SEM) image of the three-dimensional porous composite structure obtained by chemical corrosion of 0.05 g/L dilute hydrochloric acid for fifteen hours.

After etching the preform structure, a plurality of pores are formed in the preform structure. The three-dimensional porous composite structure is shown in FIG. 6 and FIG. 7. One part of carbon nanotube can be exposed through the plurality of pores, and another part of carbon nanotube can be located in the plurality of pores, and/or the others part of carbon nanotube can be covered with the inert metal.

The method for making the three-dimensional porous composite structure provided by above embodiment, a de-alloying technology is used to obtain the three-dimensional porous composite structure, a plurality of carbon nanotubes are embedded in the metal ligaments to improve conductivity, mechanical strength and stability of the three-dimensional porous composite structure, meanwhile increases the specific surface area of the three-dimensional porous composites; the interface between carbon nanotubes and inert metal is a coplanar interface, which eliminate the contact resistance between carbon nanotubes and inert metals, and further improve conductivity of the three-dimensional porous composite structure.

A biosensor using the above biosensor electrode according to one embodiment is provided. The biosensor includes a molecular recognition element and a signal conversion element. The molecular recognition element is configured to identify biochemical reaction signal and the signal conversion element is configured to convert the biochemical reaction signal into an electrical signal.

The molecular recognition element includes the three-dimensional porous composite structure. The three-dimensional porous composite structure comprises a porous structure and at least one carbon nanotube structure embedded in the porous structure. The porous structure comprises a plurality of metal ligaments and a plurality of pores. The at least one carbon nanotube structure comprises a plurality of carbon nanotubes joined end to end by van der Waals attractive force, wherein the plurality of carbon nanotubes are arranged along a same direction.

Because the metal ligaments and the carbon nanotube in the three-dimensional porous composite structure not only have good catalytic property, but also have good electrical conductivity, so the three-dimensional porous composite structure is not only configured to collect electron, but also used as a catalyst. The molecular recognition element does not require additional catalyst, which reduces internal resistance of the molecular recognition element.

The three-dimensional porous composite structure is in contact with a biomolecule to be measured, wherein the biomolecule is catalyzed to produce a biochemical reaction signal. The signal conversion element converts the biochemical reaction signal into a physical signal and outputs it to a signal processing system. The signal processing system monitors the concentration of the biomolecule to be measured by treat the physical signal. The biomolecule to be measured can be a glucose molecule, an organic molecule, an enzyme, an enzyme substrate, an antibody or an antigen, etc.

The molecular recognition element further includes a material with catalytic property. The material with catalytic property can be located in a surface of the three-dimensional porous composite structure. The material with catalytic property can be nano-oxides or metal particles, which can further improve catalytic property of the molecular recognition element. The nano-oxides can be $Co_3O_4$—$MnO_2$. Shape of the nano-oxides can be nanoparticles, nanosheets and nanometer flower.

The signal conversion element can be a physical or chemical transducer. The transducer can be selected from an oxygen electrode, a photodiode, a field effect transistor and a piezoelectric crystal. The signal conversion element converts the biochemical reaction signal into a measurable electrochemical signal to obtain the weight concentration of the biomolecule to be measured.

Because the three-dimensional porous composite structure in the biosensor is not only configured to collect electron, but also used as a catalyst, which reduces the internal resistance of the biosensor. The carbon nanotube structures have good mechanical strength, which can extend the working life of the biosensor.

Depending on the embodiment, certain of the steps of methods described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A biosensor electrode comprising:
a porous structure comprising a plurality of metal ligaments and a plurality of pores defined by adjacent metal ligaments, wherein a material of the plurality of metal ligaments is metal; and
at least one carbon nanotube structure embedded in the porous structure and comprising a plurality of carbon nanotubes joined end to end by van der Waals attractive force, wherein the plurality of carbon nanotubes are arranged along a same direction; and one of the plurality of carbon nanotubes comprises a first portion and a second portion, the first portion is embedded inside of one of the plurality of metal ligaments, an entire outer surface of the first portion is in direct contact with the one of the plurality of metal ligaments, and the second portion is located in one of the plurality of pores.

2. The biosensor electrode of claim 1, further comprising a material with catalytic property, wherein the porous structure and at least one carbon nanotube structure form a three-dimensional porous composite structure, and the material with catalytic property is located on a surface of the three-dimensional porous composite structure.

3. The biosensor electrode of claim 2, wherein the material with catalytic property is nano-oxide.

4. The biosensor electrode of claim 1, wherein a size of each of the plurality of pores is less than or equal to 100 μm.

5. The biosensor electrode of claim 1, wherein material of the plurality of metal ligaments is an inert metal.

6. The biosensor electrode of claim 1, wherein the at least one carbon nanotube structure is located in the plurality of pores.

7. The biosensor electrode of claim 1, wherein the at least one carbon nanotube structure comprises a plurality of carbon nanotube structures spaced from each other.

8. The biosensor electrode of claim 7, wherein an angle between carbon nanotubes in adjacent spaced carbon nanotube structures is in a range from 0° to 90°.

9. The biosensor electrode of claim 8, wherein the adjacent spaced carbon nanotube structure are parallel with each other.

10. The biosensor electrode of claim 1, wherein the carbon nanotube structure comprises at least one carbon nanotube film, the at least one carbon nanotube film is a drawn carbon nanotube film comprising a plurality of successively oriented carbon nanotube segments joined end-to-end by van der Waals force therebetween.

11. The biosensor electrode of claim 10, wherein the at least one carbon nanotube film comprises a plurality of carbon nanotube films coplanar or stacked.

12. The biosensor electrode of claim 11, wherein an angle between carbon nanotubes in adjacent stacked carbon nanotube films is in a range from 0° to 90°.

13. The biosensor electrode of claim 1, wherein the at least one carbon nanotube structure and the porous structure have a common interface.

14. A biosensor comprising:
a molecular recognition element configured to identify a biochemical reaction signal and the molecular recognition element comprising:
a porous structure comprising a plurality of metal ligaments and a plurality of pores, wherein a material of the plurality of metal ligaments is selected from the group consisting of copper, mercury, silver, platinum, and aurum;
at least one carbon nanotube structure embedded in the porous structure and comprising a plurality of carbon nanotubes joined end to end by van der Waals attractive force, wherein the plurality of carbon nanotubes are arranged along a same direction; and one of the plurality of carbon nanotubes comprises a first portion and a second portion, the first portion is embedded inside of one of the plurality of metal ligaments, an entire outer surface of the first portion is in direct contact with the one of the plurality of metal ligaments, and the second portion is located in one of the plurality of pores; and
a signal conversion element configured to convert the biochemical reaction signal into an electrical signal.

15. The biosensor electrode of claim 1, wherein the material of the plurality of metal ligaments is selected from the group consisting of copper, mercury, silver, platinum, and aurum.

16. The biosensor electrode of claim 1, wherein the material of the plurality of metal ligaments is mercury or silver.

17. The biosensor electrode of claim 1, wherein a portion of each of the plurality of carbon nanotubes is embedded inside of the plurality of metal ligaments, an entire outer surface of the portion is in direct contact with the plurality of metal ligaments, and another portion of each of the plurality of carbon nanotubes is located in the plurality of pores.

18. The biosensor electrode of claim 14, wherein a portion of each of the plurality of carbon nanotubes is embedded inside of the plurality of metal ligaments, an entire outer surface of the portion is in direct contact with the plurality of metal ligaments, and another portion of each of the plurality of carbon nanotubes is located in the plurality of pores.

\* \* \* \* \*